(12) United States Patent
Hansen

(10) Patent No.: US 11,199,720 B2
(45) Date of Patent: Dec. 14, 2021

(54) OPTICAL NETWORKING DEVICES AND SYSTEMS

(71) Applicant: John Paul T. Hansen, Burien, WA (US)

(72) Inventor: John Paul T. Hansen, Burien, WA (US)

( * ) Notice: Subject to any disclaimer, the term of this patent is extended or adjusted under 35 U.S.C. 154(b) by 547 days.

(21) Appl. No.: 16/177,816

(22) Filed: Nov. 1, 2018

(65) Prior Publication Data

US 2019/0146236 A1    May 16, 2019

Related U.S. Application Data

(60) Provisional application No. 62/647,394, filed on Mar. 23, 2018, provisional application No. 62/612,405, filed on Dec. 30, 2017, provisional application No. 62/584,805, filed on Nov. 11, 2017, provisional application No. 62/584,806, filed on Nov. 11, 2017.

(51) Int. Cl.
| | |
|---|---|
| *G02B 27/28* | (2006.01) |
| *G02B 6/26* | (2006.01) |
| *G02B 6/27* | (2006.01) |
| *G02F 1/1335* | (2006.01) |
| *G02B 27/10* | (2006.01) |

(Continued)

(52) U.S. Cl.
CPC ........... *G02B 27/283* (2013.01); *G02B 6/262* (2013.01); *G02B 6/27* (2013.01); *G02B 27/1073* (2013.01); *G02B 27/144* (2013.01); *G02B 27/145* (2013.01); *G02F 1/133528* (2013.01); *G02B 5/3025* (2013.01)

(58) Field of Classification Search
CPC ............. G02F 1/1313; G02F 1/133528; G02B 6/2706; G02B 5/3025; G02B 6/27; G02B 6/262; G02B 27/145; G02B 27/1073; G02B 27/144; G02B 27/283
See application file for complete search history.

(56) References Cited

U.S. PATENT DOCUMENTS 8,554,074 B2   10/2013   Boertjes et al.
10,268,046 B2 *  4/2019   Huang ................. G02B 5/3058
(Continued)

FOREIGN PATENT DOCUMENTS

JP       7-177087 A     7/1995
JP      10-206912 A     8/1998
(Continued)

*Primary Examiner* — Mariam Qureshi
(74) *Attorney, Agent, or Firm* — Seed IP Law Group LLP

(57) ABSTRACT

In various embodiments, optical networking devices and systems are provided. One such optical networking device includes a housing, a beam splitter assembly, and a polarizer assembly. The housing includes a first passage that extends between a first opening and a second opening which are aligned with one another along a first axis, and a second passage that extends between the first passage and a third opening. The third opening is aligned with and communicatively coupled to the first passage along a second axis that is transverse to the first axis. The beam splitter assembly is positioned in the first section of the housing, and includes a first shell, a beam splitter platform, and a beam splitter. The polarizer assembly is positioned in the second section of the housing, and includes a second shell, a polarizer platform, and a polarizer.

23 Claims, 13 Drawing Sheets

(51) Int. Cl.
*G02B 27/14* (2006.01)
*G02B 5/30* (2006.01)

(56) References Cited

U.S. PATENT DOCUMENTS

| | | | |
|---|---|---|---|
| 2003/0058408 A1* | 3/2003 | Magarill | G02B 5/3033 |
| | | | 353/20 |
| 2013/0128330 A1 | 5/2013 | Frankel et al. | |
| 2015/0285679 A1* | 10/2015 | Kasiutsich | G01J 3/42 |
| | | | 356/402 |
| 2016/0252796 A1 | 9/2016 | Smith et al. | |

FOREIGN PATENT DOCUMENTS

| | | |
|---|---|---|
| WO | 2017/051161 A1 | 3/2017 |
| WO | 2021/086578 A1 | 5/2021 |

\* cited by examiner

OPTICAL NETWORKING DEVICES AND SYSTEMS

TECHNICAL FIELD

The present disclosure generally relates to optical networking systems and devices, and more particularly relates to such systems and devices having a beam splitter assembly and a polarizer assembly housed within a housing.

BACKGROUND

Optical networking systems use signals encoded onto light to transmit information over fiber optic cables to and from various nodes of a telecommunications network. Due to their use of light as a transmission medium, optical networks are significantly faster than electrical communication networks which utilize copper or other conductors as the transmission medium. The optical signals transmitted over an optical networking system typically consist of a series of pulses generated by switching a laser beam on and off.

Some optical networking systems utilize wavelength-division multiplexing (WDM) so that a single optical fiber can simultaneously transmit multiple different optical signals, each having a different wavelength. Such optical systems generally utilize a variety of optical equipment to generate, transmit, and receive separate optical signals on separate wavelengths. For example, conventional WDM optical systems typically rely on optical multiplexers, optical demultiplexers, optical switches, and other expensive equipment to transmit and receive optical signals on different wavelengths.

BRIEF SUMMARY

In one or more embodiments, the present disclosure provides a beam splitter assembly that includes a shell, a beam splitter platform, and a beam splitter. The shell has an inner perimeter dimension, an inlet, a first outlet, and a second outlet. The inlet and the first outlet are aligned with one another along a first axis. The beam splitter platform extends at least partially across the inner perimeter dimension of the shell, and the beam splitter platform has an opening aligned with the first axis. A surface of the beam splitter platform is tilted with respect to a second axis which passes through the second outlet and which is transverse to the first axis. The beam splitter is attached to the surface of the beam splitter platform and positioned over the opening.

In another embodiment, the present disclosure provides a polarizer assembly that includes a cylindrical shell having an inner perimeter dimension, an inlet, and an outlet. The inlet and the outlet are aligned with one another along a first axis. A cylindrical platform extends across the inner perimeter dimension of the shell, and the platform has an aperture aligned with the first axis. A polarizer is attached to the platform and positioned over the aperture. A support block is positioned between the aperture and an inner surface of the shell, and the support block has a surface that extends through the outlet of the shell. A fastener block having a threaded fastener receptacle is included in the polarizer assembly, and the fastener block is positioned opposite to the surface of the support block.

In another embodiment, the present disclosure provides an optical networking device that includes a housing, a beam splitter assembly, and a polarizer assembly. The housing includes a first passage and a second passage. The first passage extends between a first opening and a second opening, and the first and second openings are aligned with one another along a first axis. The second passage extends between the first passage and a third opening, and the third opening is aligned with and communicatively coupled to the first passage along a second axis that is transverse to the first axis.

The beam splitter assembly is positioned in the first passage of the housing, and the beam splitter assembly includes a first shell, a beam splitter platform, and a beam splitter. The first shell has an inner perimeter dimension, an inlet and a first outlet through which the first axis passes, and a second outlet through which the second axis passes. The beam splitter platform extends at least partially across the inner perimeter dimension of the first shell, and the beam splitter platform has a tilted surface with respect to the second axis, and an opening aligned with the first axis. The beam splitter is attached to the surface of the beam splitter platform and positioned over the opening of the beam splitter platform.

The polarizer assembly is positioned in the second passage of the housing. The polarizer assembly may include a second shell, a polarizer platform, and a polarizer. The second shell has an inner perimeter dimension, and an inlet and an outlet through which the second axis passes. The polarizer platform extends across the inner perimeter dimension of the second shell, and has an aperture aligned with the second axis. The polarizer is attached to the polarizer platform and positioned over the aperture of the polarizer platform.

In yet another embodiment, the present disclosure provides an optical networking system that includes a plurality of optical receivers communicatively coupled to one another. Each of the optical receivers includes a housing, a beam splitter assembly, and a polarizer assembly. Each of the polarizer assemblies includes a respective polarizer, each of which has a particular orientation of polarization which, in use, passes only light having the particular orientation of polarization. The particular orientation of polarization is different for each of the polarizers. The polarizers may be variable polarizers which are controllable to have the particular orientations of polarization.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Figure 1A:
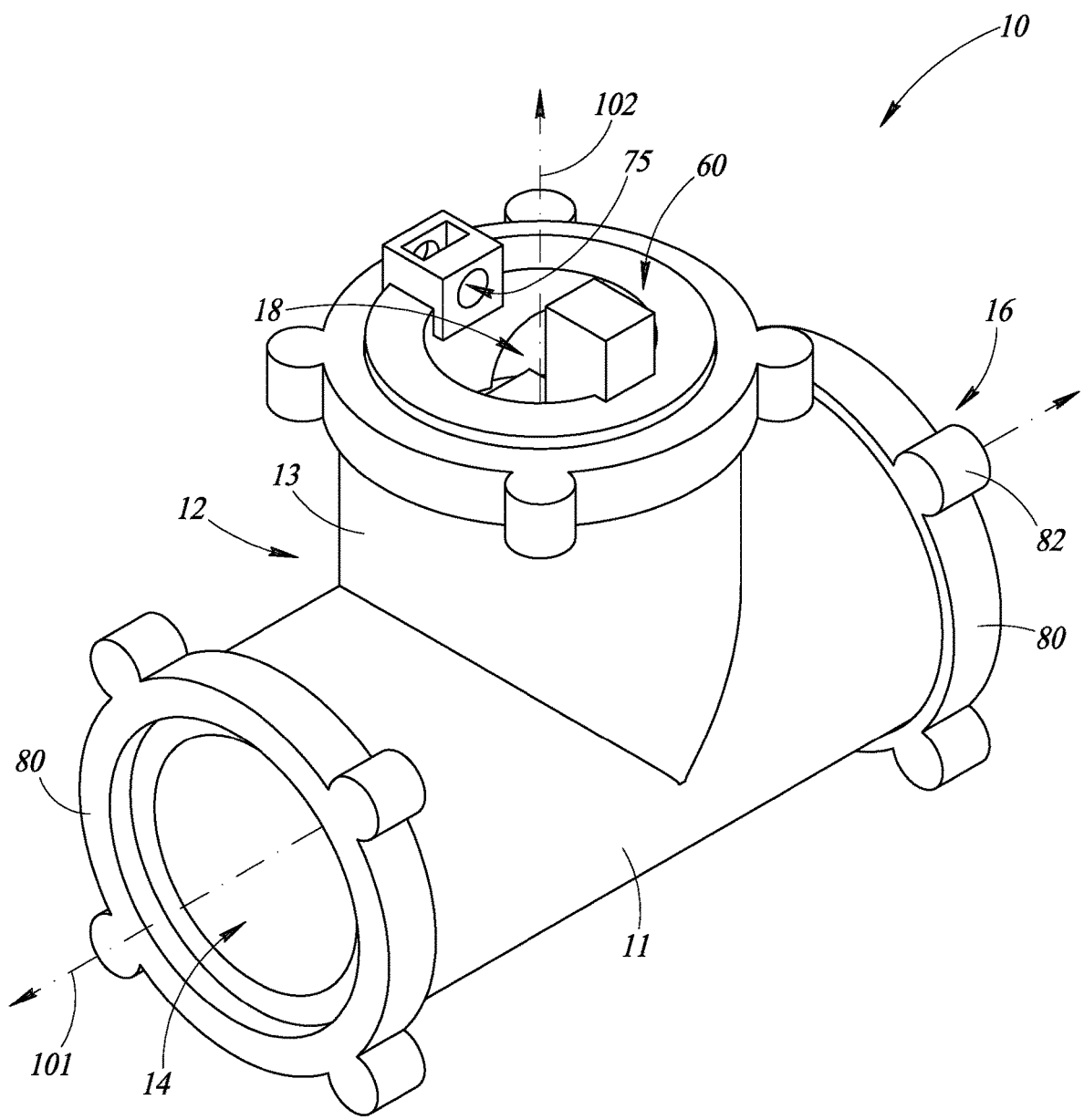
FIG. 1A is a perspective view illustrating an optical networking device, in accordance with one or more embodiments.
Figure 1B:
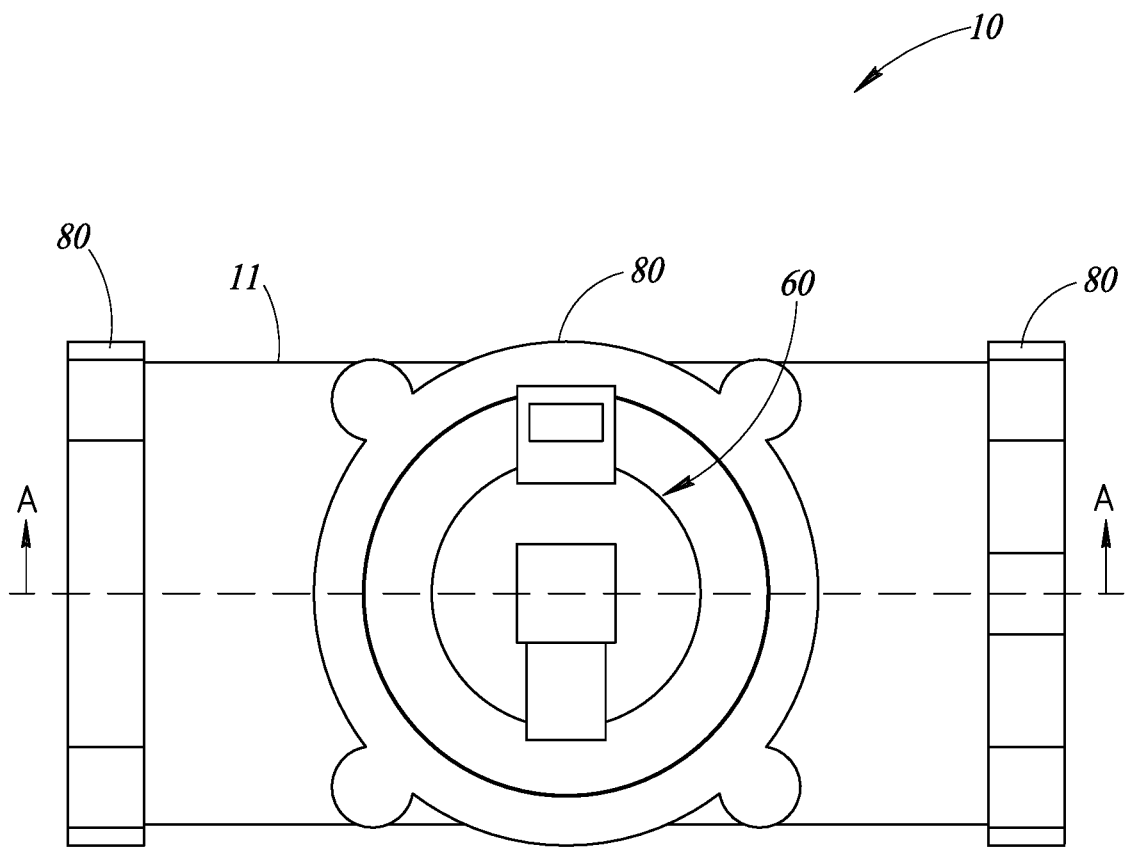
FIG. 1B is a top plan view of the optical networking device shown in FIG. 1A.
Figure 1C:
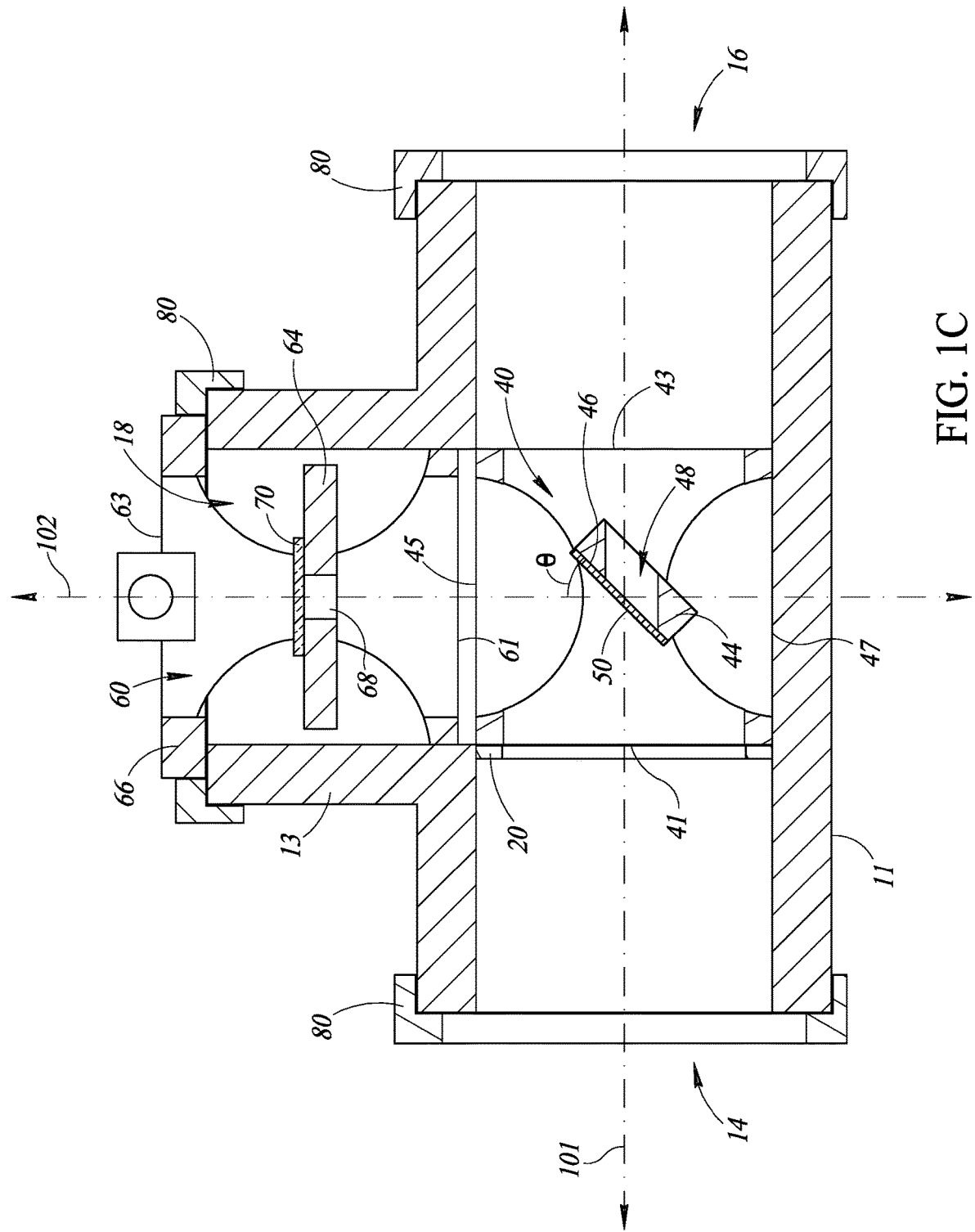
FIG. 1C is a cross-sectional diagram of the optical networking device shown in FIG. 1A, taken along the line A-A shown in FIG. 1B.

Turning now to FIGS. 1A, 1B, and 1C, illustrated therein is an optical networking device 10 which includes a housing 12, a beam splitter assembly 40, and a polarizer assembly 60. The beam splitter assembly 40 is shown in further detail in FIGS. 2A, 2B, and 2C, and the polarizer assembly 60 is shown in further detail in FIGS. 3A, 3B, and 3C, which will be described in further detail below.

The housing 12 includes a first passage 11 (which may be referred to herein as a "first section 11") and a second passage 13 (which may be referred to herein as a "second section 13") which are communicatively coupled to one another. The first section 11 extends between a first opening 14 and a second opening 16, and the first and second openings 14, 16 are aligned with one another along a first axis 101. As will be described in further detail below, the first axis 101 may be a main optical axis along which an optical communication beam having one or more polarized optical signals is transmitted or received.

The second section 13 extends between the first section 11 and a third opening 18. The first section 11 may include an internal opening between the first and second openings 14, 16, and the second section 13 may be physically coupled to the internal opening of the first section 11, so that the third opening 18 is aligned with and communicatively coupled to the first section 11 along a second axis 102 that is transverse to the first axis 101. In some embodiments, the second axis 102 is perpendicular to the first axis 101.

The housing 12 may be made of any suitable material, including any plastic material. In some embodiments, the housing may be made of polyvinyl chloride (PVC), acrylonitrile butadiene styrene (ABS), or polyactic acid (PLA) plastic materials. In some embodiments, the housing 12 may be formed of an optically opaque material, and in some embodiments, inner surfaces of the housing 12 may be anti-reflective or may be coated, for example, with an anti-reflective layer.

The housing 12 is hollow between the first and second openings 14, 16 of the first section 11, and between the first section 11 and the third opening 18 of the second section 13. As shown in the Figures, the housing 12 may have a cylindrical shape, although embodiments provided herein are not limited to such a cylindrical shape. For example, in various embodiments, the housing 12 may have other shapes, such as rectangular, triangular, or any other shape suitable for accommodating an optical communication beam.

In some embodiments, the optical networking device 10 may include one or more external supports 80 which are mechanically coupled to an exterior surface of the housing 12. For example, as shown in FIG. 1A, first and second external supports 80 may be mechanically coupled to an exterior surface of the first section 11 of the housing 12, and a third external support 80 may be mechanically coupled to an exterior surface of the second section 13 of the housing 12. The external supports 80 may be positioned adjacent to, or in some embodiments, may extend at least partially over, the first opening 14, the second opening 16, and the third opening 18.

In embodiments having a cylindrical shaped housing 12, the external supports 80 may be ring shaped, with an inner surface of the ring shaped external supports 80 being mechanically coupled to the exterior surface of the cylindrical housing 12. The external supports 80 may be mechanically coupled to the housing 12 by any suitable technique, including, for example, by an adhesive, plastic welding, and in some embodiments, the external supports 80 and the housing 12 may be integrally formed as a single piece of a same material.

The external supports 80 may include a plurality of extensions 82 which extend outwardly, e.g., radially outwardly with respect to the first axis 101, from respective outer segments of the external supports 80. As shown for example in FIG. 1A, each of the external supports 80 may include four extensions 82, with neighboring extensions being spaced apart from one another by a same distance or arc length of the ring shaped external support 80. The extensions 82 of the external supports 80 may be used to support the device 10 in a stable position when resting on a flat surface in a way similar to legs of a table. For example, the device 10 may be placed on a flat surface, with two extensions 82 of the external support 80 positioned around the first opening 14 of the first section 11 contacting the surface, and with two corresponding extensions 82 of the external support 80 positioned around the second opening 16 contacting the surface.

The beam splitter assembly 40 is positioned in the first section 11 of the housing 12, as shown in FIG. 1C. With reference to FIGS. 1A-1C and FIGS. 2A-2C, the beam splitter assembly 40 includes a shell 42 which has an inner perimeter dimension, for example, an inner diameter D1 as measured across an inner surface of the shell 42. As shown in the Figures, the shell 42 may have a cylindrical shape having the inner diameter D1, and further having an outer diameter that is sized to correspond with a shape of the inner surfaces of the first section 11 of the housing 12. Accordingly, the shell 42 may be removably positioned within the first section 11 of the housing 12 as shown in FIG. 1C.

The first section 11 of the housing 12 may further include an internal flange 20 that extends inwardly from the inner surface of the first section 11, for example, toward the first axis 101. As shown in FIG. 1C, an end surface of the beam splitter assembly 40 may be positioned in abutting contact with the internal flange 20, which provides proper positioning of the beam splitter assembly 40 and prevents the beam splitter assembly 40 from being inserted in the first section 11 of the housing 12 past the internal flange 20.

The shell 42 of the beam splitter assembly 40 includes, or otherwise defines, an inlet 41, a first outlet 43, and a second outlet 45. In some embodiments, the shell 42 may further include a third outlet 47. Each of the inlet 41, the first outlet 43, the second outlet 45, and the third outlet 47 may be circular or elliptical openings formed in the shell 42.

The inlet 41 and the first outlet 43 are aligned with one another, and when properly positioned within the first section 11 of the housing 12, as shown in FIG. 1C, the first axis 101 passes through the inlet 41 and the first outlet 43. When so positioned, the second axis 102 passes through the second outlet 45. In embodiments including the third outlet 47, the second outlet 45 is aligned with the third outlet 47 and the second axis 102 passes through both the second outlet 45 and the third outlet 47.

The beam splitter assembly 40 further includes a beam splitter platform 44 that extends across the inner diameter D1 of the shell 42. In some embodiments, the platform 44 may be integrally formed with the shell 42, i.e., with the shell 42 and the platform 44 being a single, unitary piece. The beam splitter platform 44 has a tilted surface 46, which is tilted at an angle θ with respect to the second axis 102. In some embodiments, the angle θ is substantially equal to 45°, so that the surface 46 of the beam splitter platform 44 is oriented at a 45° angle with respect to the second axis 102.

The shell 42 and the beam splitter platform 44 may be made of any suitable material, including any plastic material, such as acrylonitrile butadiene styrene (ABS), or polyactic acid (PLA) plastic materials.

An aperture 48 extends completely through the beam splitter platform 44, and the aperture 48 is aligned with the first axis 101 when the beam splitter assembly 40 is positioned within the first section 11 of the housing 12, as shown in FIG. 1C. A beam splitter 50 is attached to the surface 46 of the beam splitter platform 44, with the beam splitter 50 positioned over and covering the aperture 48 of the beam splitter platform 44.

The beam splitter 50 may be any optical beam splitting element that "splits" an incident beam into two beams, each of which retains properties of the incident beam, such as polarization-encoded information carried by an optical communication beam. More particularly, the beam splitter 50 partially transmits the incident beam and partially reflects the incident beam. A first portion of the incident beam (i.e., the transmitted portion) is passed directly through the beam splitter 50 along the main optical communication axis, e.g., the first axis 101 as shown in FIG. 1C, while a second portion of the incident beam (i.e., the reflected portion, which may be referred to herein as the "copy beam") is transmitted in a direction orthogonal to the main optical communication axis, e.g., along the second axis 102 as shown in FIG. 1C. The beam splitter 50 may be, for example, a beam splitter cube, a metal-coated mirror such as a half-silvered mirror, or the like. In some embodiments, the beam splitter 50 may preferably be a non-polarizing beam splitter, so that the copy beam retains the polarization state of the incident beam.

The beam splitter 50 may have any transmission-to-reflection ratio suitable for a desired application of the device 10. For example, in some embodiments, the beam splitter 50 may have a transmission-to-reflection ratio of 50:50, 80:20, 95:5, or even 99:1.

Referring now to FIGS. 1A-1C and FIGS. 3A-3C, the polarizer assembly 60 is positioned in the second section 13 of the housing 12. The polarizer assembly 60 includes a shell 62 which has an inner perimeter dimension, for example, an inner diameter D2 as measured across an inner surface of the shell 62. The inner diameter D2 of the polarizer assembly shell 62 may be the same as the inner diameter D1 of the beam splitter assembly shell 42. In some embodiments, the shell 62 may have a cylindrical shape, and may have an outer diameter that is sized to correspond with a shape of the inner surfaces of the second section 13 of the housing 12. The shell 62 may thus be removably positioned within the second section 13 of the housing 12 as shown in FIG. 1C.

The shell 62 includes, or otherwise defines, an inlet 63, and an outlet 61. In some embodiments, the shell 62 may further include first and second openings 65, 67 between the inlet 63 and the outlet 61. Each of the inlet 63, the outlet 61, the first opening 65, and the second opening 67 may be circular or elliptical openings formed in the shell 62.

The inlet 63 and the outlet 61 of the polarizer assembly shell 62 are aligned with one another, and when properly positioned within the second section 13 of the housing 12, as shown in FIG. 1C, the second axis 102 passes through the inlet 63 and the outlet 61. Additionally, the inlet 63 of the polarizer assembly shell 62 is aligned with the second outlet 45 of the beam splitter assembly 40. Accordingly, when an optical communication beam is incident on the beam splitter 50, a copy beam is split by the beam splitter 50 and is directed along the second axis 102 through the inlet 63 of the polarizer assembly 60.

The shell 62 further includes an external flange 66 positioned adjacent to the outlet 61 and which extends outwardly from an inner surface of the shell 62 away from the second axis 102. A surface of the external flange 66 abuts an end surface of the second section 13 of the housing 12, as shown in FIG. 1C. The external flange 66 thus fixes a position into which the polarizer assembly 60 may extend into the second section 13 of the housing 12 and prevents the polarizer assembly 60 from extending deeper into the second section 13.

The polarizer assembly 60 further includes a polarizer platform 64 which extends across the inner diameter D2 of the shell 62. The polarizer platform 64 may be circular or cylindrical in shape and may have a diameter that is the same as the inner diameter D2 of the shell 62. In some embodiments, the polarizer platform 64 may be integrally formed with the shell 62, i.e., with the shell 62 and the platform 64 being a single, unitary piece. Additionally, the polarizer platform 64 has an aperture 68 which extends completely through the platform 64 and is aligned with the second axis 102 when the polarizer assembly 60 is positioned in the second section 13 of the housing 12. A polarizer 70 is attached to a surface of the polarizer platform 64, with the polarizer 70 positioned over and covering the aperture 68 of the polarizer platform 64.

The polarizer 70 may be any optical filter that permits light waves having a specific polarization to pass through the polarizer 70, while blocking light waves of all other polarizations. In some embodiments, the polarizer 70 may be an absorptive, linear polarizer, which passes only linearly polarized light having a particular orientation or angle of polarization and which absorbs portions of a received light beam having different polarization states.

The polarizer assembly further includes a support block 72 and a fastener block 74. The support block 72 is positioned between the aperture 68 of the polarizer platform 64 and the inner surface of the polarizer assembly shell 62, with a surface 71 of the support block 72 extending through the outlet 61 of the polarizer assembly shell 62.

The fastener block 74 may similarly extend at least partially through the outlet 61 of the polarizer assembly shell 62. The fastener block 74 is positioned opposite to the surface 71 of the support block 72. A fastener receptacle 75 (see FIG. 1A) extends through the fastener block 74 along a direction that intersects the surface 71 of the support block 72. In some embodiments, the fastener receptacle 75 has internal threads, and a threaded fastener (not shown) may be advanced through the fastener receptacle 75 by rotation of the threaded fastener and toward the surface 71 of the fastener block 74. In use, an optical fiber (not shown) may be positioned between the support block 72 and the fastener block 74, and the optical fiber may be held in a desired position (e.g., aligned with the aperture 68) by advancing the threaded fastener toward the surface 71 until the optical fiber is firmly held between the threaded fastener and the surface 71.

In some embodiments, the fastener block 74 includes a slot 76 that extends through the fastener receptacle 75. The slot 76 may be sized to accommodate a nut (not shown) and to position a threaded opening of the nut in alignment with the fastener receptacle 75. In such embodiments, the threaded fastener may be advanced through the fastener receptacle (which may be unthreaded) and through the threaded opening of the nut to engage an optical fiber and hold the optical fiber in a desired position against the surface 71 of the support block 72.

The shell 62 of the polarizer assembly, the polarizer platform 44, the support block 72, and the fastener block 74 may be formed of a single, unitary piece, and may be made of any suitable material, including any plastic material, such as acrylonitrile butadiene styrene (ABS), or polyactic acid (PLA) plastic materials.

Figure 4A:
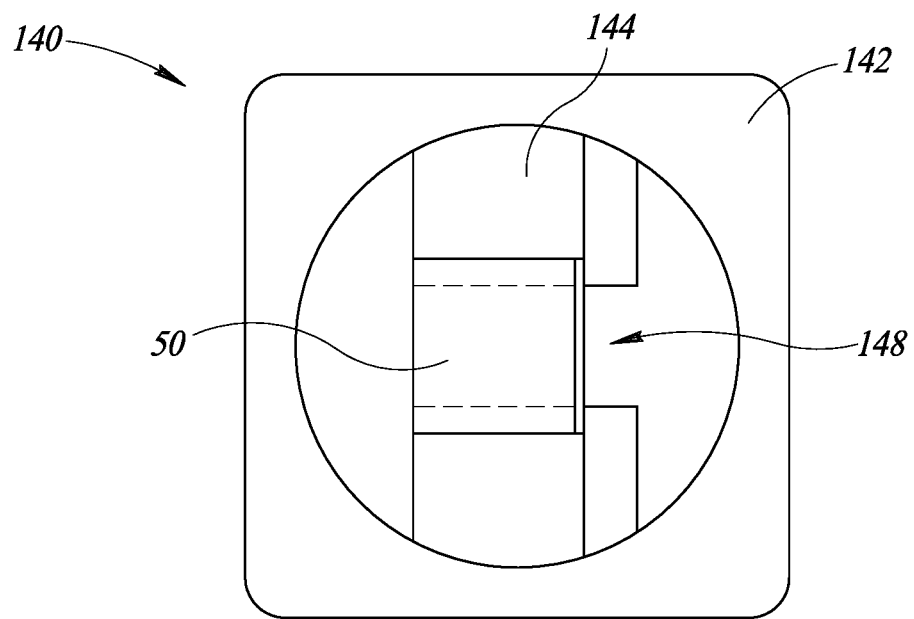
FIG. 4A is a top plan view illustrating a beam splitter assembly, in accordance with one or more embodiments.
Figure 4B:
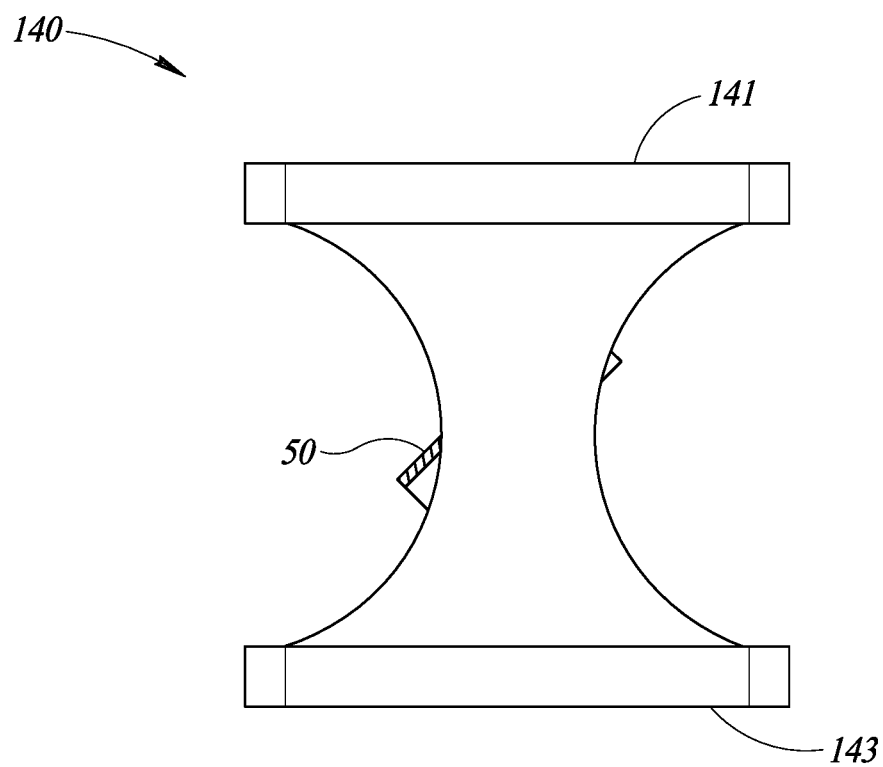
FIG. 4B is a front side view of the beam splitter assembly shown in FIG. 4A.
Figure 4C:
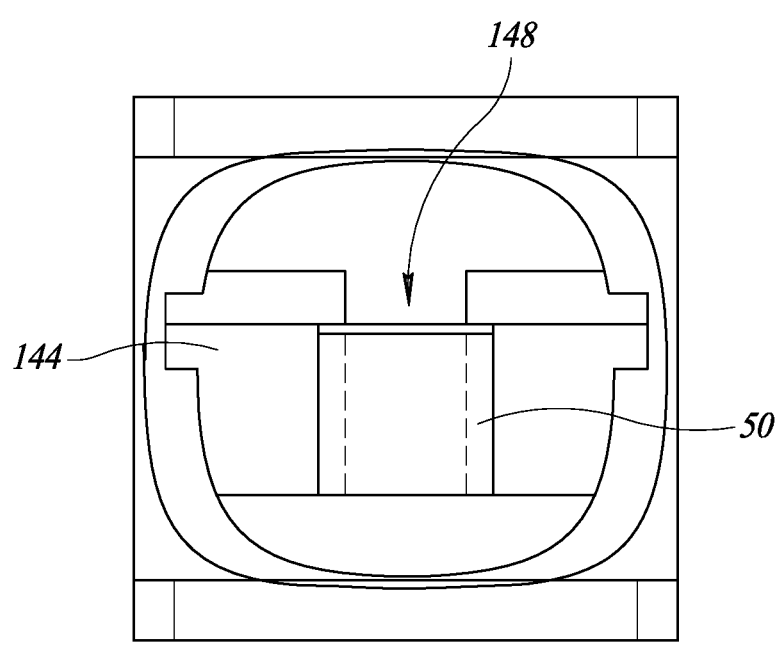
FIG. 4C is a left side view of the beam splitter assembly shown in FIG. 4A.

As noted previously herein, in some embodiments, the housing 12 of the optical networking device 10 may have other shapes, such as a rectangular shape. FIGS. 4A to 4C respectively illustrate top plan, front side, and left side views of a beam splitter assembly 140 having a generally rectangular outer shape and which may be utilized, for example, in embodiments of the optical networking device 10 having a rectangular shaped housing 12.

The beam splitter assembly 140 shown in FIGS. 4A to 4C is similar in structure and function to the beam splitter assembly 40 shown in FIGS. 2A to 2C, except for the differences that will be discussed below. The features shared by the beam splitter assembly 140 and the beam splitter assembly 40 will not be described here again in the interest of brevity.

Figure 2A:
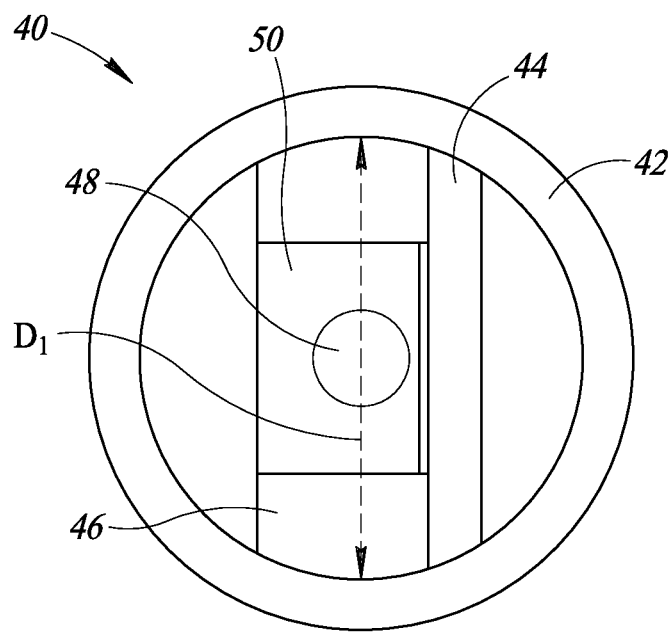
FIG. 2A is a top plan view illustrating a beam splitter assembly, in accordance with one or more embodiments.
Figure 2B:
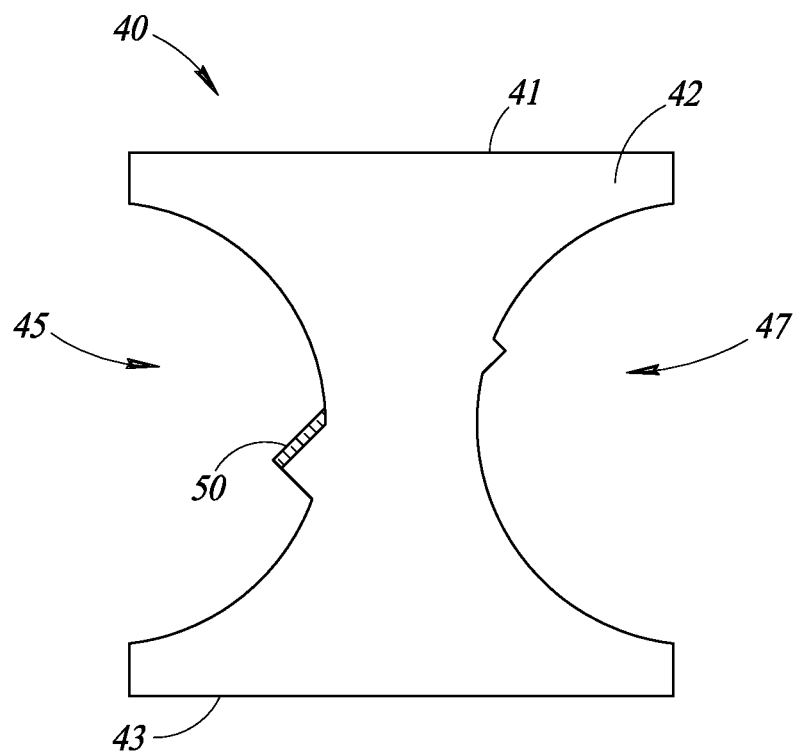
FIG. 2B is a front side view of the beam splitter assembly shown in FIG. 2A.
Figure 2C:
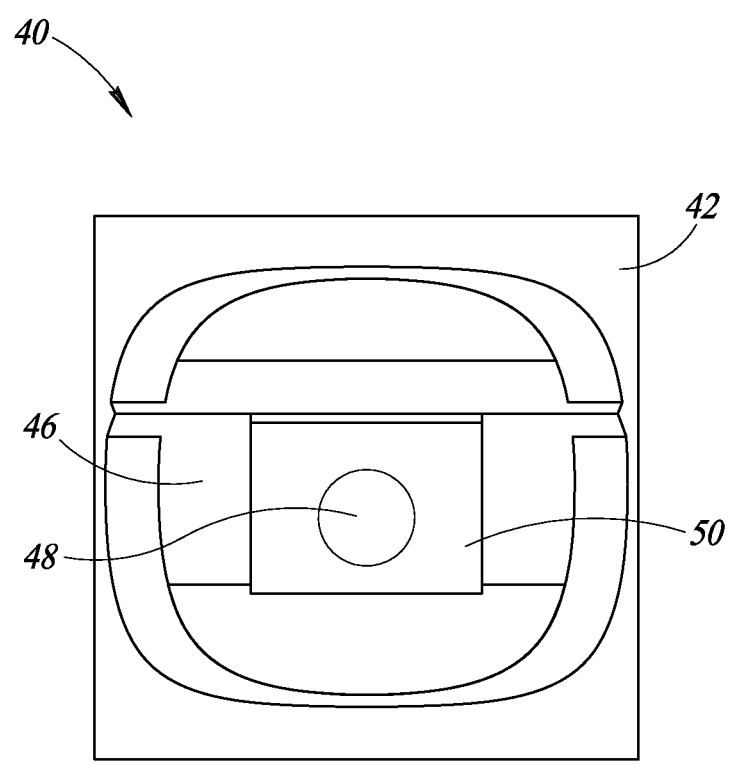
FIG. 2C is a left side view of the beam splitter assembly shown in FIG. 2A.

One difference between the beam splitter assembly 140 shown in FIGS. 4A to 4C and the beam splitter assembly 40 shown in FIGS. 2A to 2C is that the shell 142 of the beam splitter assembly 140 has a rectangular outer dimension. For example, as shown in the top view of FIG. 4A and the front view of FIG. 4B, the beam splitter assembly 140 has a substantially square outer shape at the inlet 141 and the outlet 143. Accordingly, in embodiments in which the housing 12 of the optical networking device 10 has a rectangular inner shape, the rectangular outer shape of the beam splitter assembly 140 may substantially correspond with the rectangular inner shape of the housing 12. The rectangular outer shape of the beam splitter assembly 140 may be sized to snuggly fit within the rectangular inner shape of the housing 12, and the beam splitter assembly 140 may be removably positioned within the first section 11 of the rectangular shaped housing 12. Moreover, in some embodiments, the rectangular inner shape of the housing 12 may fix or otherwise limit an orientation of the beam splitter assembly 140, as the rectangular outer shape of the beam splitter assembly 140 will only fit into housing 12 in, at most, four different orientations. In some embodiments, the beam splitter assembly 140 may include one or more protrusions which fit into corresponding slots or grooves within the housing 12 such that the beam splitter assembly 140 may only fit into the housing 12 in a particular orientation.

Another difference between the beam splitter assembly 140 and the beam splitter assembly 40 is that the platform 144 of the beam splitter assembly 140 includes an opening 148 instead of an aperture 48. The opening 148 may separate the platform 144 into opposite portions which face each other across the opening 148, as shown in FIG. 4A. The beam splitter 50 may be positioned over the opening 148 and may be supported at opposite ends by the opposite portions of the platform 144. In some embodiments, the beam splitter assembly 140 may include the same platform 44 as shown in FIGS. 2A to 2C, e.g., with an aperture 48 extending through a central portion of the platform 44, and may have a rectangular or square outer shape as shown in FIGS. 4A to 4C. Similarly, in some embodiments, the beam splitter assembly 40 shown in FIGS. 2A to 2C may include the same platform 144 as shown in FIGS. 4A to 4C, including the opening 148 instead of an aperture 48.

Figure 5A:
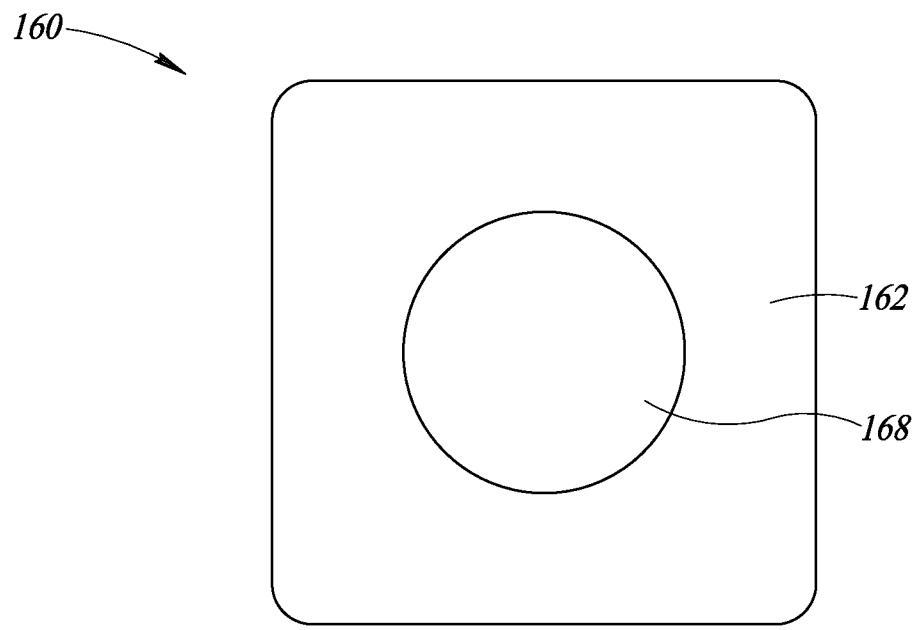
FIG. 5A is a top plan view illustrating a polarizer assembly, in accordance with one or more embodiments.
Figure 5B:
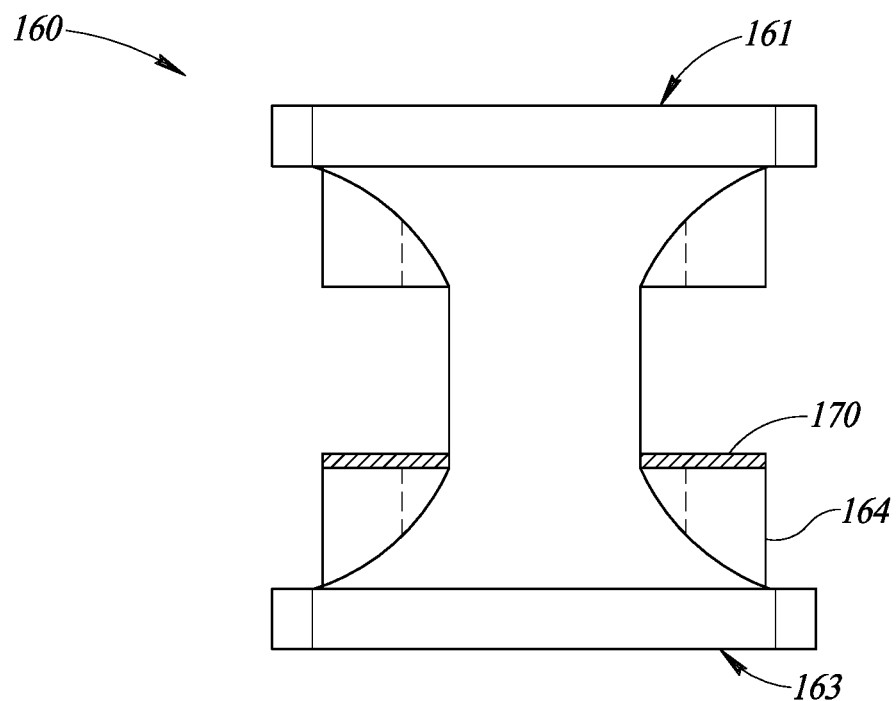
FIG. 5B is a front side view of the polarizer assembly shown in FIG. 5A.
Figure 5C:
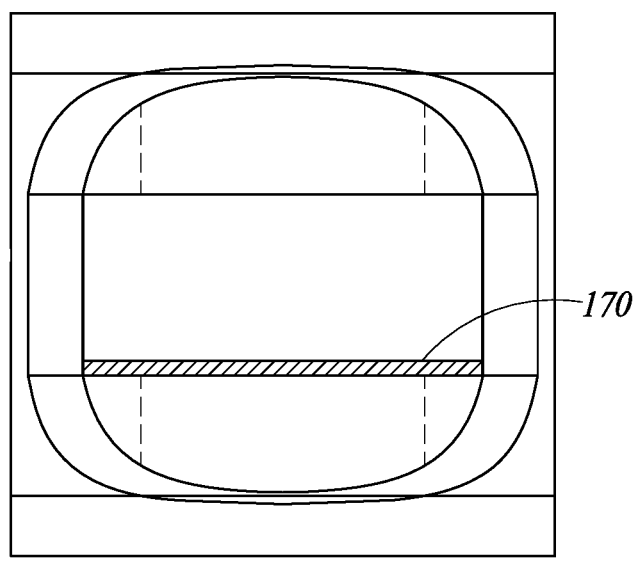
FIG. 5C is a right side view of the polarizer assembly shown in FIG. 5A.

FIGS. 5A to 5C respectively illustrate top plan, front side, and right side views of a polarizer assembly 160 having a generally rectangular outer shape and which may be utilized, for example, in embodiments of the optical networking device 10 having a rectangular shaped housing 12.

The polarizer assembly 160 shown in FIGS. 5A to 5C is similar in structure and function to the polarizer assembly 60 shown in FIGS. 3A to 3C, except for the differences that will be discussed below. The features shared by the polarizer assembly 160 and the polarizer assembly 60 will not be described here again in the interest of brevity.

Figure 3A:
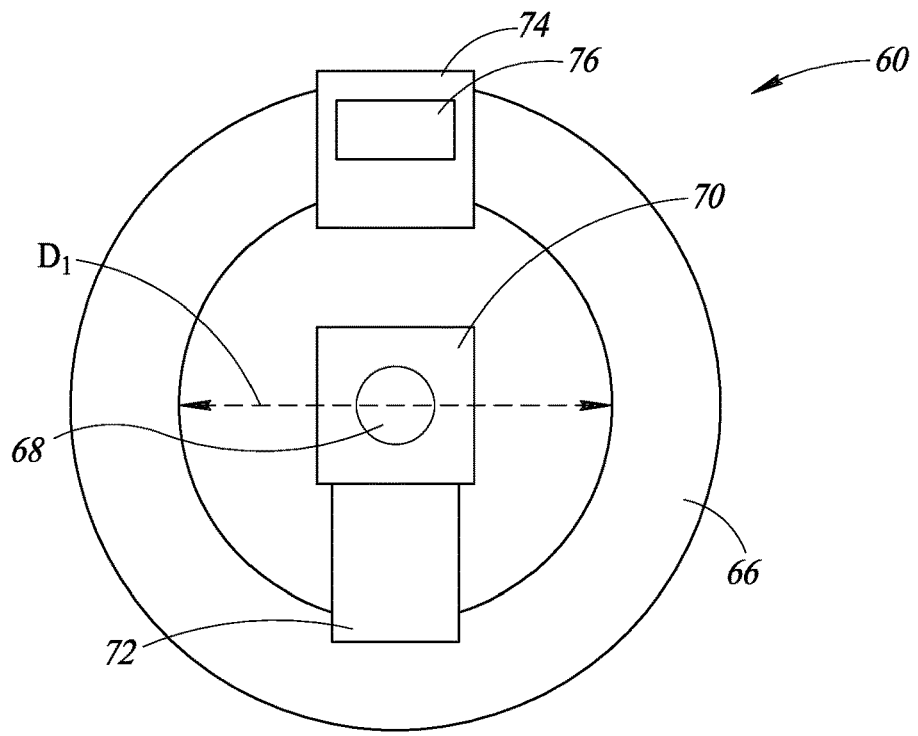
FIG. 3A is a top plan view illustrating a polarizer assembly, in accordance with one or more embodiments.
Figure 3B:
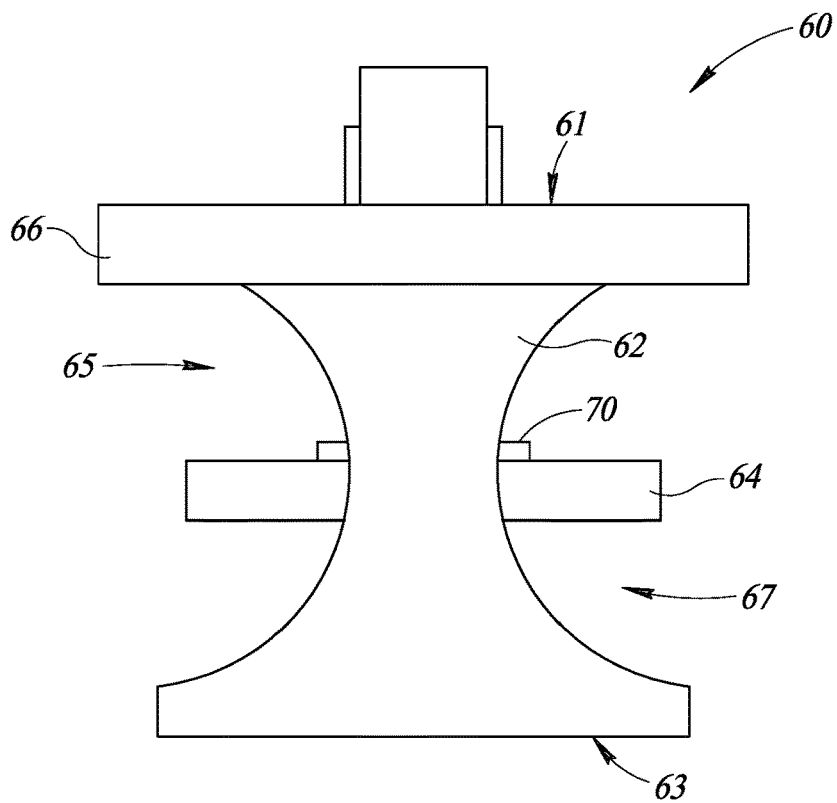
FIG. 3B is a front side view of the polarizer assembly shown in FIG. 3A.
Figure 3C:
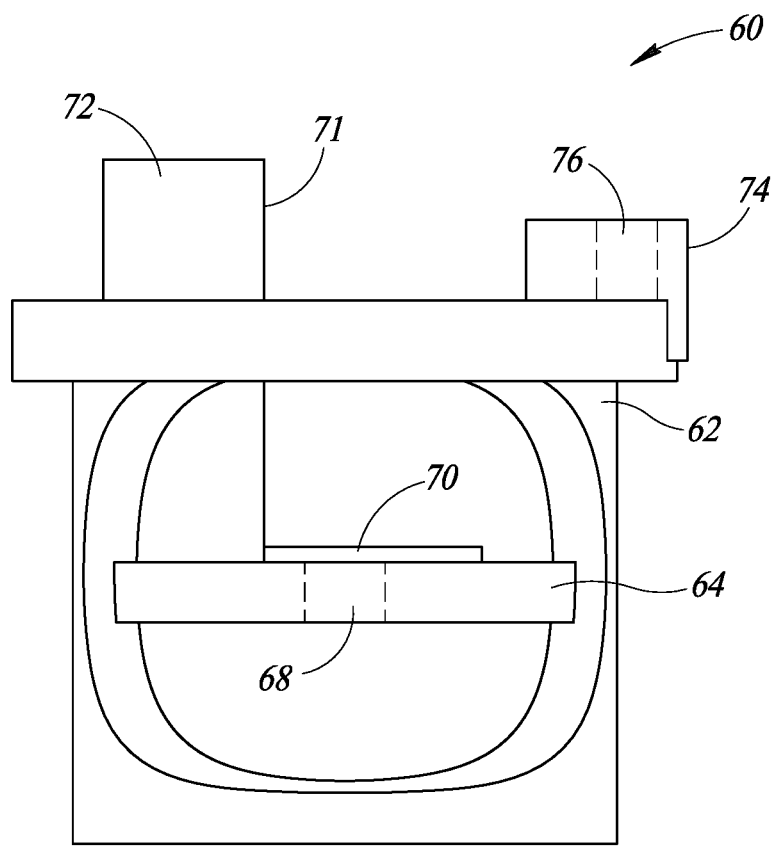
FIG. 3C is a right side view of the polarizer assembly shown in FIG. 3A.

One difference between the polarizer assembly 160 shown in FIGS. 5A to 5C and the polarizer assembly 60 shown in FIGS. 3A to 3C is that the shell 162 of the polarizer assembly 160 has a rectangular outer dimension. For example, as shown in the top view of FIG. 5A and the front view of FIG. 5B, the polarizer assembly 160 has a substantially square outer shape at the outlet 141 and the inlet 143. Accordingly, in embodiments in which the housing 12 of the optical networking device 10 has a rectangular inner shape, the rectangular outer shape of the polarizer assembly 160 may substantially correspond with the rectangular inner shape of the housing 12. The rectangular outer shape of the polarizer assembly 160 may be sized to snuggly fit within the rectangular inner shape of the housing 12, and the polarizer assembly 160 may be removably positioned within the second section 13 of the rectangular shaped housing 12. Additionally, in some embodiments, the rectangular inner shape of the housing 12 may fix or otherwise limit an orientation of the polarizer assembly 160, as the rectangular outer shape of the polarizer assembly 160 will only fit into housing 12 in, at most, four different orientations. In some embodiments, the polarizer 160 may include one or more protrusions which fit into corresponding slots or grooves within the housing 12 such that the polarizer assembly 160 may only fit into the housing 12 in a particular orientation.

A variable polarizer 170 may be positioned on a platform 164 of the polarizer assembly 160. The variable polarizer 170 may be any polarization element or device which has variable polarization states. For example, in some embodiments, the variable polarizer 170 includes a liquid crystal layer which is controllable to selectively pass light having different polarizations. The liquid crystal layer may be controlled, for example, by control signals provided from a microcontroller to pass light having any particular orientation. Accordingly, the variable polarizer 170 may be operated to electronically tune in and out of different transmissions, e.g., which may be provided on channels having differing polarization states.

In some embodiments, the variable polarizer 170 may be positioned between the polarizer assembly 160 and beam splitter assembly 140. For example, in some embodiments, the housing 12 may include a slot between the first section 11 and the second section 13, and the variable polarizer 170 may be accommodated within the slot, such that the variable polarizer 170 is positioned between the polarizer assembly 160 and the beam splitter assembly 140. In such embodiments, the polarizer assembly 160 may serve to hold an optical fiber (which may be utilized to transmit or to receive optical signals), for example, in an aperture 168.

Figure 6:
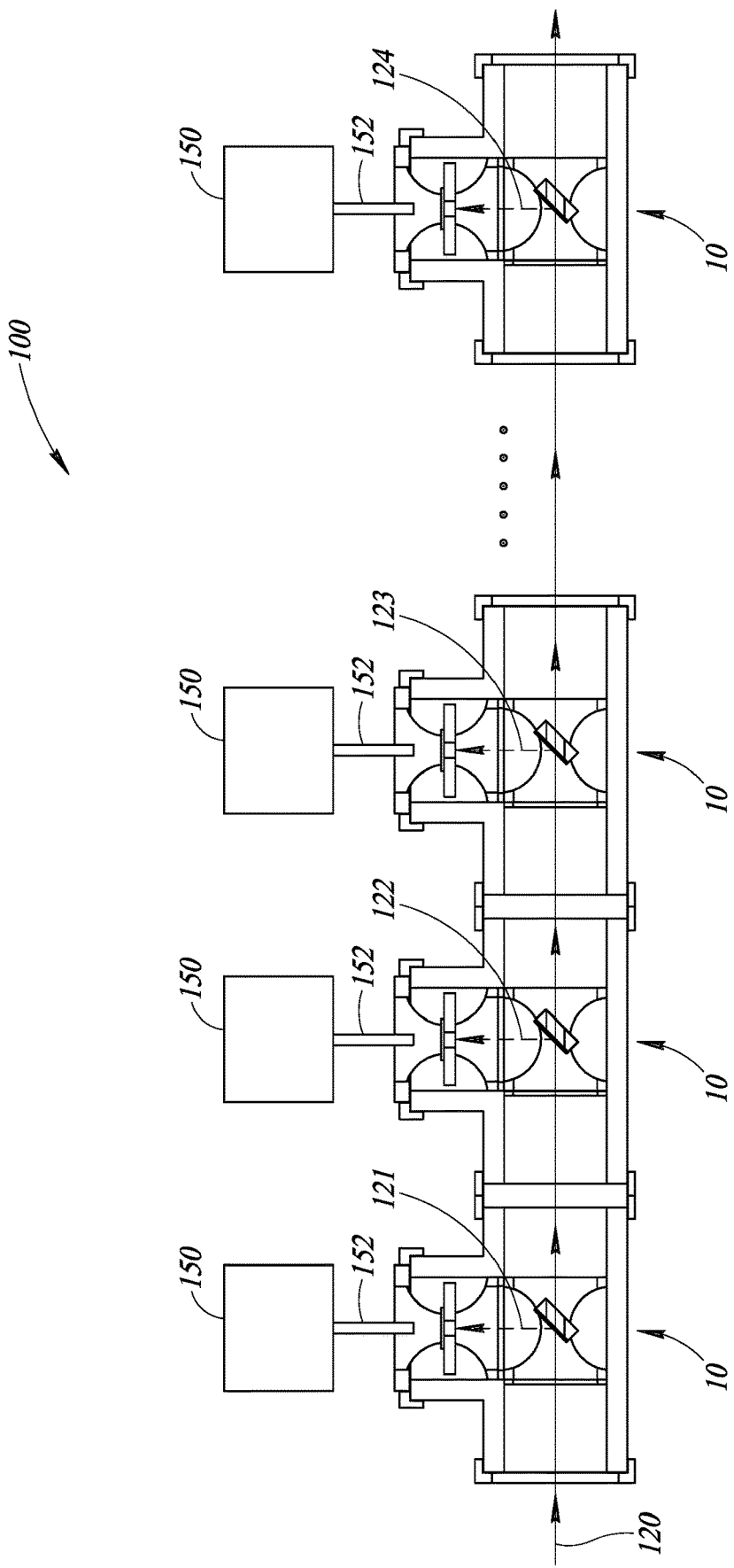
FIG. 6 is a schematic diagram illustrating an optical networking system, in accordance with one or more embodiments.

FIG. 6 illustrates an optical networking system 100, in accordance with one or more embodiments of the present disclosure. The optical networking system 100 includes a plurality of optical networking devices 10, which may be the same as the optical networking device 10 described herein with reference to FIGS. 1A through 5C. The optical networking devices 10 are be communicatively coupled to one another, which may be accomplished, for example, by positioning the external support 80 positioned around the second opening 16 of a first device 10 in abutting contact with the external support 80 positioned around the first opening 14 of a next device 10 along an optical communication path. The system 100 may include any number of optical networking devices 10 arranged in such a sequence, i.e., with the second opening 16 of a device 10 aligned with and communicatively coupled to the first opening 14 of a next device 10.

Each of the optical networking devices 10 of the system 100 may be referred to herein as an optical receiver, since the devices 10 are configured to receive an optical communication beam. Each of the polarizers 70 of the plurality of optical receivers has a particular orientation of polarization which, in use, passes only light having the particular orientation of polarization, and the particular orientation of polarization is different for each of the polarizers 70. Accordingly, each of the optical networking devices 10 (or optical receivers) is configured to pass only light having a particular, specific polarization state through the polarizer 70. Alternatively, in some embodiments, each of the optical networking devices 10 of the system 100 may include a variable polarizer 170, and each optical networking device 10 may be tuned to receive optical signals having a particular orientation of polarization.

In use, a composite optical communication beam 120 is received by a first device 10 of the optical networking system 100. The composite beam 120 may include multiple encoded beams of polarized light, which are combined into a single, collimated beam. Each of the multiple encoded beams of light may be continuous beams of light that are encoded in binary, e.g., with a "1" being a brief duration of linearly polarized light that is polarized in a particular polarization state or polarization angle. A "0" may be encoded in such beams as a brief duration of light that is polarized in any polarization state that is effectively filtered out by the polarized filters of the beam's recipient. In some embodiments, a common "0" polarization angle or polarization state may be established, which may reduce crosstalk between systems that may communicate with one another. The composite beam 120 may be formed, for example, by passing the multiple beams of encoded through a plurality of beam splitters in series, combining the beams of light into one column.

The beam splitter 50 of the first device 10 transmits the composite beam 120 through the aperture 48 (or through the opening 148), and at the same time reflects a copy beam 121 through the polarizer assembly 60 or 160. The polarizer 70 or the variable polarizer 170 of the first device 10 transmits only a portion of the copy beam 121 having the particular orientation of polarization of the polarizer 70 or variable polarizer 170. For example, the polarizer 70 or the variable polarizer 170 of the first device 10 may pass only a portion of the copy beam 121 having a first linear polarization angle. The transmitted portion of the copy beam 121 is received by an optical fiber 152, which may be aligned with the aperture 68 or opening 168 of the polarizer assembly 60 or 160 as described previously herein, e.g., by engaging the optical fiber 152 between the support block 72 and the fastener block 74.

The optical fiber 152 may be coupled to a computing system 150, which may be any computing system capable of processing a received polarization-encoded optical signal. For example, the computing system 150 may be any computing system capable of decoding, converting, and/or storing information associated with the received polarization-encoded optical signal. In some embodiments, the computing system 150 may include a microcontroller that is operable to control the variable polarizer 170 to pass only portions of the copy beam 121 having a particular polarization angle to the optical fiber 152. In some embodiments, a single microcontroller is communicatively coupled to, and operable to selectively control, each of the variable polarizers 170 in each of the optical networking devices 10. The portion of the copy beam 121 that is transmitted through the polarizer 70 or variable polarizer 170 of the first device 10 may thus be considered as a first communication signal carried by the composite beam 120. Similarly, the optical fiber 152 and computing system 150 may be considered as a first receiving channel of the system 100.

The composite beam 120 continues through the second opening 16 of the first device 10 and into the first opening 14 of a next device 10 in the system 100, where the composite beam 120 is again split by a beam splitter 50 and a second copy beam 122 is reflected to the polarizer 70 or the variable polarizer 170 of the next device 10. The polarizer 70 or the variable polarizer 170 of the next device 10 transmits only portion of the copy beam 122 having a particular orientation of polarization that is different from that of the first device 10 in the system 100. For example, the polarizer 70 or the variable polarizer 170 of the next device 10 may pass only a portion of the copy beam 122 having a second linear polarization angle which is different from the first linear polarization angle transmitted by the first device 10. The transmitted portion of the copy beam 122 is similarly received by a second optical fiber 152 which may be coupled to a computing system 150, which in some embodiments may be the same computing system 150 coupled to the first device 10, i.e., with the second optical fiber 152 being coupled to a second receiving channel of the computing system 152.

The composite beam 120 may be provided to any number of optical networking devices 10, with each of the devices 10 providing respective optical communication signals having differently polarized light to respective optical fibers 152 of the system 100.

Accordingly, the system 100 facilitates relaying of multiple coherent messages simultaneously within a single transmission, e.g., by a composite beam 120 which carries multiple beams of differently polarized light. Moreover, the system 100 facilitates decoding of overlapping messages coherently, as each of the optical networking devices 10 of the system 100 is configured to transmit a particular optical communication signal (or a particularly polarized beam of light) that is carried by the composite beam to an associated optical fiber 152 and computing system 150.

The composite beam 120, as well as the multiple, differently polarized optical communication beams carried by the composite beam 120, may be light beams having any wavelengths. In some embodiments, the light beams are light beams within the infrared or visible spectrum.

Figure 7:
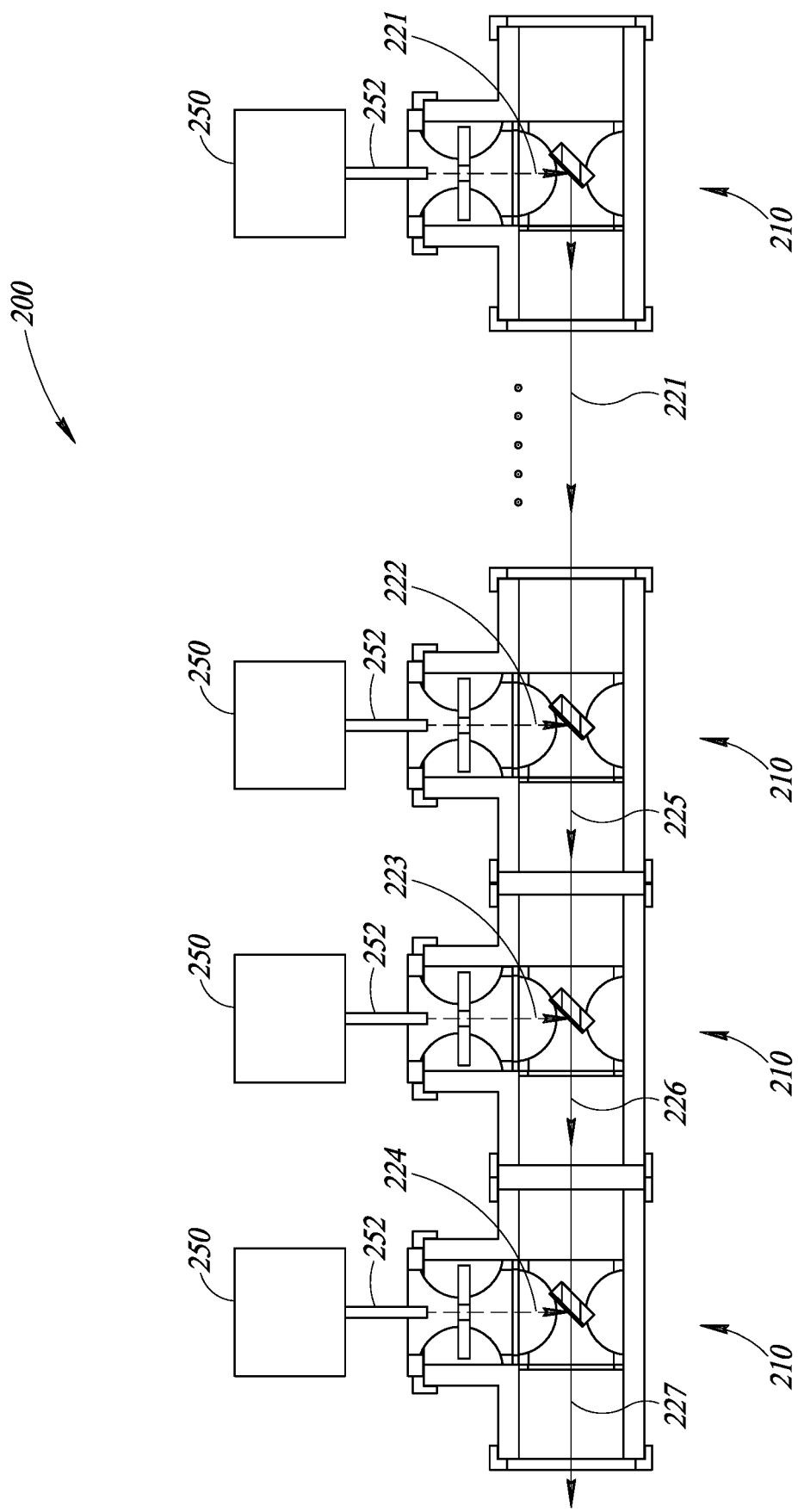
FIG. 7 is a schematic diagram illustrating another optical networking system, in accordance with one or more embodiments.

FIG. 7 illustrates an optical networking system 200, in accordance with one or more embodiments of the present disclosure. The optical networking system 200 is similar in layout to the optical system 100 shown in FIG. 6; however, the optical system 100 is configured with the optical devices 10 being optical receivers, while the optical system 200 of FIG. 7 is configured with the optical devices 210 being optical beam collimators, or optical transmitters.

The system 200 includes a plurality of optical networking devices 210, which are substantially the same as the optical networking device 10 described herein with reference to FIGS. 1A through 5C, except that the polarizer 70 or the variable polarizer 170 is not present in the devices 210. It should be noted, however, that the optical networking devices 210 of the system 200 may include the variable polarizer 170 in some embodiments. In such embodiments, for example, the variable polarizer 170 may be controlled to pass light having any orientation of polarization.

The optical networking devices 210 are be communicatively coupled to one another, and the system 200 may include any number of optical networking devices 210 arranged in such a sequence as shown. The system 200 includes a plurality of polarized beam emitters 250, each of which emits an optical communication beam having a particular orientation of polarization. The polarized beam emitters 250 may be, for example, laser emitters that emit linearly polarized light. A first emitter 250 (e.g., the emitter further to the right side of FIG. 7) emits a first linearly polarized beam 221 through a first optical fiber 252. The first beam 221 is reflected by the beam splitter 50 of a first device 210 and is transmitted to a next device 210 of the system 200 (e.g., to the next device on the left as shown in FIG. 7). The beam splitter 50 of the next device 210 receives the first beam 221 and further receives a second beam 222 which is transmitted to the beam splitter 50 by a second polarized beam emitter 250. The first and second beams 221, 222 have different polarization states, and are combined into a composite beam 225 by the beam splitter 50. This process may be repeated through each optical device 210 of the system 200, i.e., additional differently linearly polarized beams 223, 224 being emitted by respective polarized beam emitters 250, and combined with one another by respective beam splitters 50 of the optical devices 210. An output composite beam 227 which includes a plurality of differently linearly polarized beams may thus be generated by the system 200.

The various embodiments described above can be combined to provide further embodiments. To the extent that they are not inconsistent with the specific teachings and definitions herein, all of the U.S. patent applications which are owned by the present Applicant: U.S. Provisional Patent Application Ser. No. 62/647,394, U.S. Provisional Patent Application Ser. No. 62/584,805, U.S. Provisional Patent Application Ser. No. 62/584,806, and U.S. Provisional Patent Application Ser. No. 62/612,405 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical networking device, comprising:
   a housing, including:
   a first passage that extends between a first opening and a second opening, the first and second openings being aligned with one another along a first axis; and
   a second passage that extends between the first passage and a third opening, the third opening being aligned with and communicatively coupled to the first passage along a second axis that is transverse to the first axis;
   a beam splitter assembly positioned in the first passage of the housing, the beam splitter assembly including:
   a first shell having an inner perimeter dimension, the first shell having an inlet and a first outlet through which the first axis passes, and a second outlet through which the second axis passes;
   a beam splitter platform that extends at least partially across the inner perimeter dimension of the first shell, the beam splitter platform having a tilted surface with respect to the second axis, and an opening aligned with the first axis; and
   a beam splitter attached to the surface of the beam splitter platform and positioned over the opening of the beam splitter platform; and
   a polarizer assembly positioned in the second passage of the housing.

2. The optical networking device of claim 1 wherein the polarizer assembly includes a variable polarizer, the variable polarizer being controllable to selectively pass light having different orientations of polarization.

3. The optical networking device of claim 2 wherein the variable polarizer comprises a liquid crystal layer.

4. The optical networking device of claim 1 wherein the polarizer assembly includes:
   a second shell having an inner perimeter dimension, the second shell having an inlet and an outlet through which the second axis passes;
   a polarizer platform that extends across the inner perimeter dimension of the second shell, the polarizer platform having an aperture aligned with the second axis; and
   a polarizer attached to the polarizer platform and positioned over the aperture of the polarizer platform.

5. The optical networking device of claim 4 wherein the second shell of the polarizer assembly includes an external flange adjacent to the outlet, which external flange extends outwardly from an inner surface of the second shell away from the second axis, a surface of the external flange abuts an end surface of the second passage of the housing.

6. The optical networking device of claim 4 wherein the polarizer assembly further includes:
   a support block between the aperture of the polarizer platform and an inner surface of the second shell, the support block having a surface that extends through the outlet of the second shell;
   a fastener block having a fastener receptacle, the fastener block positioned opposite to the surface of the support block; and
   a threaded fastener which is advanceable through the fastener receptacle of the fastener block toward the surface of the support block to engage an optical fiber, if any, that passes through the outlet of the second shell.

7. The optical networking device of claim 6 wherein the threaded fastener is advanceable through the fastener receptacle of the fastener block toward the surface of the support block to hold the optical fiber, if any, between an end of the threaded fastener and the surface of the support block at a position that aligns the optical fiber with the aperture of the polarizer platform and the second axis.

8. The optical networking device of claim 6 wherein the fastener block includes a slot that extends through the fastener receptacle, the polarizer assembly further including a nut positioned in the slot, the nut having a threaded opening aligned with the fastener receptacle, the threaded fastener advanceable through the threaded opening of the nut.

9. The optical networking device of claim 1 wherein the first passage of the housing includes an internal flange that extends inwardly from an inner surface of the first passage toward the first axis, an end surface of the beam splitter assembly abuts the internal flange.

10. The optical networking device of claim 1 wherein the beam splitter is a non-polarizing beam splitter.

11. The optical networking device of claim 1, further comprising:
    a first external support mechanically coupled to an exterior surface of the housing adjacent to the first opening, the first external support including a first plurality of extensions; and
    a second external support mechanically coupled to the exterior surface of the housing adjacent to the second opening, the second external support including a second plurality of extensions which are aligned with the first plurality of extensions.

12. The optical networking device of claim 11, further comprising a third external support mechanically coupled to the exterior surface of the housing adjacent to the third opening, the third external support including a third plurality of extensions.

13. An optical networking system, comprising:
    a plurality of optical networking devices communicatively coupled to one another, each of the optical networking devices including:
      a housing, including:
        a first passage that extends between a first opening and a second opening, the first and second openings being aligned with one another along a first axis; and
        a second passage that extends between the first passage and a third opening, the third opening being aligned with and communicatively coupled to the first passage along a second axis that is transverse to the first axis;
      a beam splitter assembly positioned in the first passage of the housing, the beam splitter assembly including:
        a first shell having an inner perimeter dimension, the first shell having an inlet and a first outlet through which the first axis passes, and a second outlet through which the second axis passes;
        a beam splitter platform that extends at least partially across the inner perimeter dimension of the first shell, the beam splitter platform having a tilted surface with respect to the second axis, and an opening aligned with the first axis; and
        a beam splitter attached to the surface of the beam splitter platform and positioned over the opening of the beam splitter platform; and
      a polarizer assembly positioned in the second passage of the housing, the polarizer assembly including:
        a second shell having an inner perimeter dimension, the second shell having an inlet and an outlet through which the second axis passes; and
        a polarizer positioned over the beam splitter,
    wherein each of the polarizers of the plurality of optical receivers has a particular orientation of polarization which, in use, passes only light having the particular orientation of polarization, the particular orientation of polarization being different for each of the polarizers.

14. The optical networking system of claim 13 wherein the polarizers are variable polarizers, each of which is controllable to have the particular orientations of polarization.

15. The optical networking system of claim 13 wherein the first shell includes an opening opposite to the second outlet and aligned with the second outlet along the second axis.

16. The optical networking system of claim 13 wherein the surface of the beam splitter platform is tilted at a 45° angle with respect to the second axis.

17. The optical networking system of claim 13 wherein the beam splitter is oriented at a 45° angle with respect to the second axis.

18. The optical networking system of claim 13 wherein the first shell and the beam splitter platform comprise a unitary monolithic object.

19. The optical networking system of claim 13 wherein the beam splitter is a non-polarizing beam splitter.

20. The optical networking system of claim 13 wherein the polarizer assembly includes:

a platform that extends across the inner perimeter dimension of the second shell, the polarizer being attached to the platform and positioned over the aperture;

a support block between the aperture and an inner surface of the second shell, the support block having a surface that extends through the outlet of the second shell; and a fastener block having a threaded fastener receptacle, the fastener block positioned opposite to the surface of the support block.

21. The optical networking system of claim 20 wherein the second shell of the polarizer assembly includes an external flange adjacent to the outlet and which extends radially outwardly from the inner surface of the second shell.

22. The optical networking system of claim 20 wherein the fastener block includes a slot that extends through the fastener receptacle, the slot sized to receive a nut, if any, and to align a threaded opening of the nut, if any, with the fastener receptacle.

23. The optical networking system of claim 20 wherein the polarizer is an absorptive, linear polarizer.

* * * * *